(12) United States Patent
Yang

(10) Patent No.: US 8,199,897 B2
(45) Date of Patent: Jun. 12, 2012

(54) COMMUNICATION NETWORK SYSTEM AND CALL PICKUP METHOD THEREOF

(75) Inventor: Yu-Chun Yang, Luzhou (TW)

(73) Assignee: Quanta Computer Inc., Tao Yuan Shien (TW)

( * ) Notice: Subject to any disclaimer, the term of this patent is extended or adjusted under 35 U.S.C. 154(b) by 544 days.

(21) Appl. No.: 12/483,449

(22) Filed: Jun. 12, 2009

(65) Prior Publication Data

US 2010/0086118 A1    Apr. 8, 2010

(30) Foreign Application Priority Data

Oct. 3, 2008   (TW) .............................. 97138258 A

(51) Int. Cl.
    *H04M 7/00*    (2006.01)

(52) U.S. Cl. ............... 379/212.01; 379/201.01; 370/352

(58) Field of Classification Search ............ 379/212.01, 379/211.01; 370/352
    See application file for complete search history.

(56) References Cited

U.S. PATENT DOCUMENTS

| 2009/0097626 A1* | 4/2009 | McMurry et al. ........ 379/201.01 |
| 2009/0279533 A1* | 11/2009 | Strebel et al. ................. 370/352 |
| 2010/0097626 A1* | 4/2010 | Moore ........................ 358/1.13 |

FOREIGN PATENT DOCUMENTS

| CN | 1984157 | 6/2007 |
| CN | 101064755 | 10/2007 |

* cited by examiner

*Primary Examiner* — Creighton Smith

(74) *Attorney, Agent, or Firm* — Thomas, Kayden, Horstemeyer & Risley, LLP

(57) ABSTRACT

The invention discloses a call pickup method for a communication network system comprising a first terminal and a second terminal. The method comprise the steps of: (a) setting a common group extension in each of the first terminal and the second terminal; (b) transmitting a pickup request message via the common group extension from the second terminal while the first terminal is receiving an incoming call from a third terminal; (c) receiving the pickup request message from the second terminal via the common group extension at the first terminal; (d) transmitting a transfer message related to the pickup request message from the first terminal to the third terminal; (e) transmitting an invitation message from the third terminal to the second terminal; and (f) establishing the incoming call between the second terminal and the third terminal.

16 Claims, 3 Drawing Sheets

_COMMUNICATION NETWORK SYSTEM AND CALL PICKUP METHOD THEREOF_

CROSS-REFERENCE TO RELATED APPLICATION

This utility application claims priority to Taiwan Application Serial Number 097138258, filed Oct. 3, 2008, which is incorporated herein by reference.

BACKGROUND OF THE INVENTION

1. Field of the Invention

The present invention relates to a call pickup method, and more particularly, to a call pickup method for a communication network system.

2. Description of the Prior Art

Call pickup is a very useful function for a small and commercial private branch exchange (PBX) system. In detail, in a work group or in the same office, the call pickup is a function that allows one to answer a phone call to certain telephone used by someone else via said one's own telephone.

Generally, the function of call pickup should be performed in a PBX system. In other words, a telephone does not have the function of call pickup without the support of the PBX server. In early days, when a user wanted to pick up an incoming call to a specific phone, the user had to dial the extension number of the phone. However, the user is required to memorize the extension number, and it is inconvenient. Currently, through another method, what the user has to do is to dial an access key merely. For example, the user just presses " " the button to pick up the incoming call without memorizing any extension number.

Nevertheless, only complicated settings are accomplished in the PBX server, the above two conventional call pickup methods can be performed. Furthermore, different PBX servers have different settings, so it is impractical and confusing for users.

From the view of this problem, the main scope of the invention is to provide a call pickup method for a communication network system.

SUMMARY OF THE INVENTION

Accordingly, an aspect of the present invention is to provide a call pickup method for a communication network system comprising a first terminal and a second terminal. The call pickup method comprises the following steps according to one embodiment of the invention.

First of all, a common group extension is set for the first terminal and the second terminal in each of the first terminal and the second terminal. A pickup request message from the second terminal is transmitted via the common group extension while the first terminal is receiving an incoming call from a third terminal. Then the pickup request message from the second terminal is received via the common group extension at the first terminal. Subsequently, a transfer message related to the pickup request message is transmitted from the first terminal to the third terminal. Next, an invitation message is transmitted from the third terminal to the second terminal. Afterwards, the incoming call is established between the second terminal and the third terminal to accomplish the purpose of call pickup.

The other aspect of the present invention is to provide a communication network system. According to one embodiment of the invention, the communication network system comprises a server, a first terminal, and a second terminal. A common group extension, for the first terminal and the second terminal, is set in each of the first terminal and the second terminal. Besides, the first terminal and the second terminal can communicate with each other via the server.

A pickup request message from the second terminal is transmitted via the common group extension to the first terminal while the first terminal is receiving an incoming call from a third terminal. Subsequently, the pickup request message from the second terminal is received via the common group extension at the first terminal. Then, a transfer message related to the pickup request message is transmitted from the first terminal to the third terminal. Next, an invitation message is transmitted from the third terminal to the second terminal. Afterwards, the incoming call is established between the second terminal and the third terminal to accomplish the purpose of call pickup.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
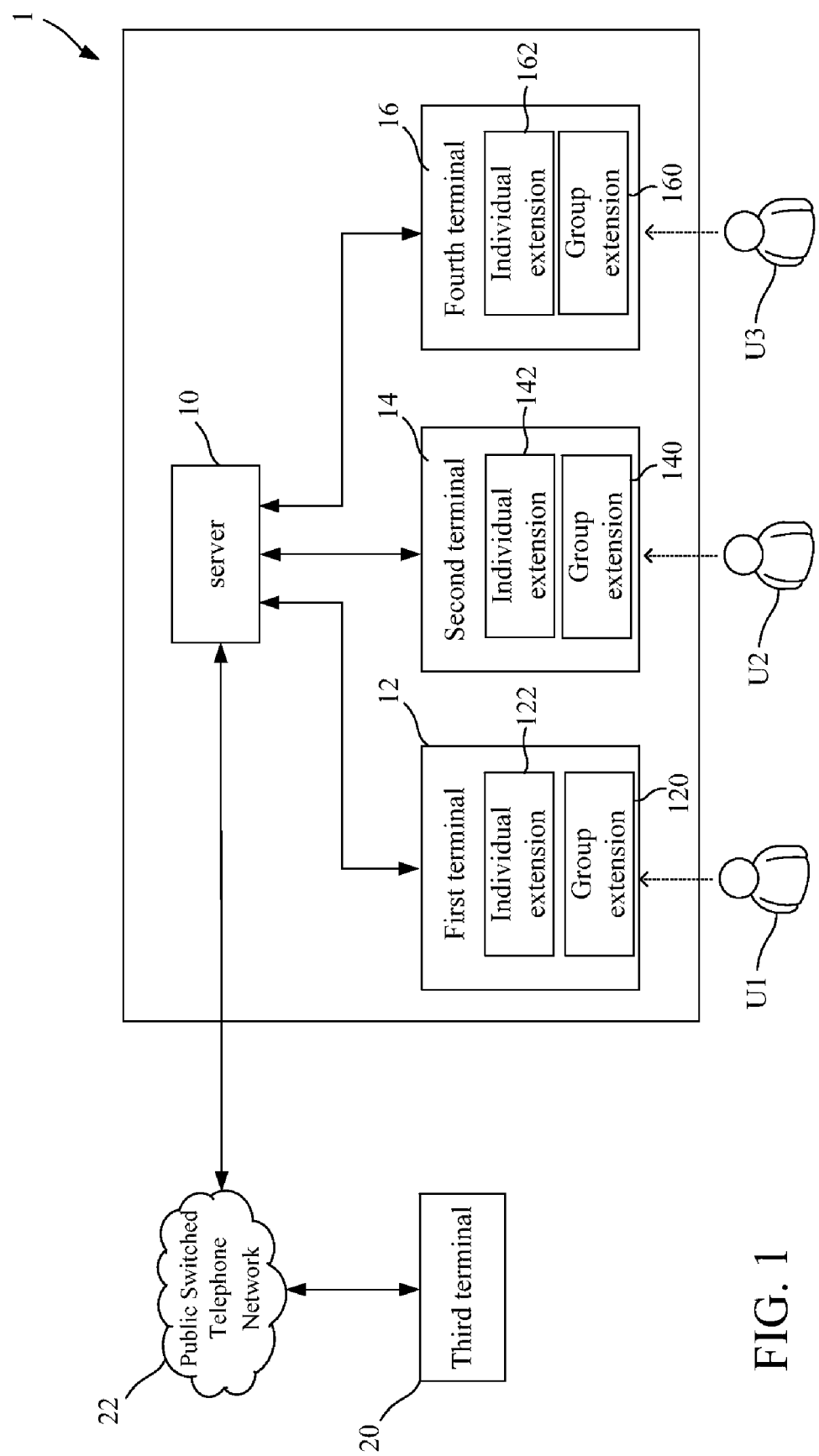
FIG. 1 illustrates a function block diagram of a communication network system according to one embodiment of the invention.

Please refer to FIG. 1. FIG. 1 illustrates a function block diagram of a communication network system 1 according to one embodiment of the invention.

As shown in FIG. 1, the communication network system 1 comprises a server 10, a first terminal 12, a second terminal 14, and a fourth terminal 16. In practice, the first terminal 12, the second terminal 14, and the fourth terminal 16 communicate with each other via the server 10 through a local area network (LAN). Moreover, the network is not limited to LAN. In practice applications, the communication system 1 comprises a PBX server, and a session initiation protocol (SIP) is applied to the communication network system 1.

In the communication network system 1, the first terminal 12, the second terminal 14, and the fourth terminal 16 are arranged into a group, and common group extensions (120, 140, and 160) are set in the terminals (12, 14, and 16) respectively. In addition to the common group extensions, the first terminal 12, the second terminal 14, and the fourth terminal 16 have their own extension numbers (122, 142, and 162). For example, although a third terminal 20 is set outside the communication network system 1, it still can selectively dial the extension numbers (122, 142, and 162) of the terminals (12, 14, and 16) in the communication network system 1 to communicate via a public switched telephone network (PSTN).

It should be explained that the extension numbers (122, 142, and 162) of the first terminal 12, the second terminal 14, and the fourth terminal 16 are different to each other; however, the common group extensions (120, 140, and 160) of the three terminals are identical. Additionally, the first group extension 120, the second extension 140, and the fourth group extension 160 are standard for the PBX server. That is to say, the first terminal 12, the second terminal 14, and the fourth terminal 16 need not extra support of the PBX server.

Figure 2:
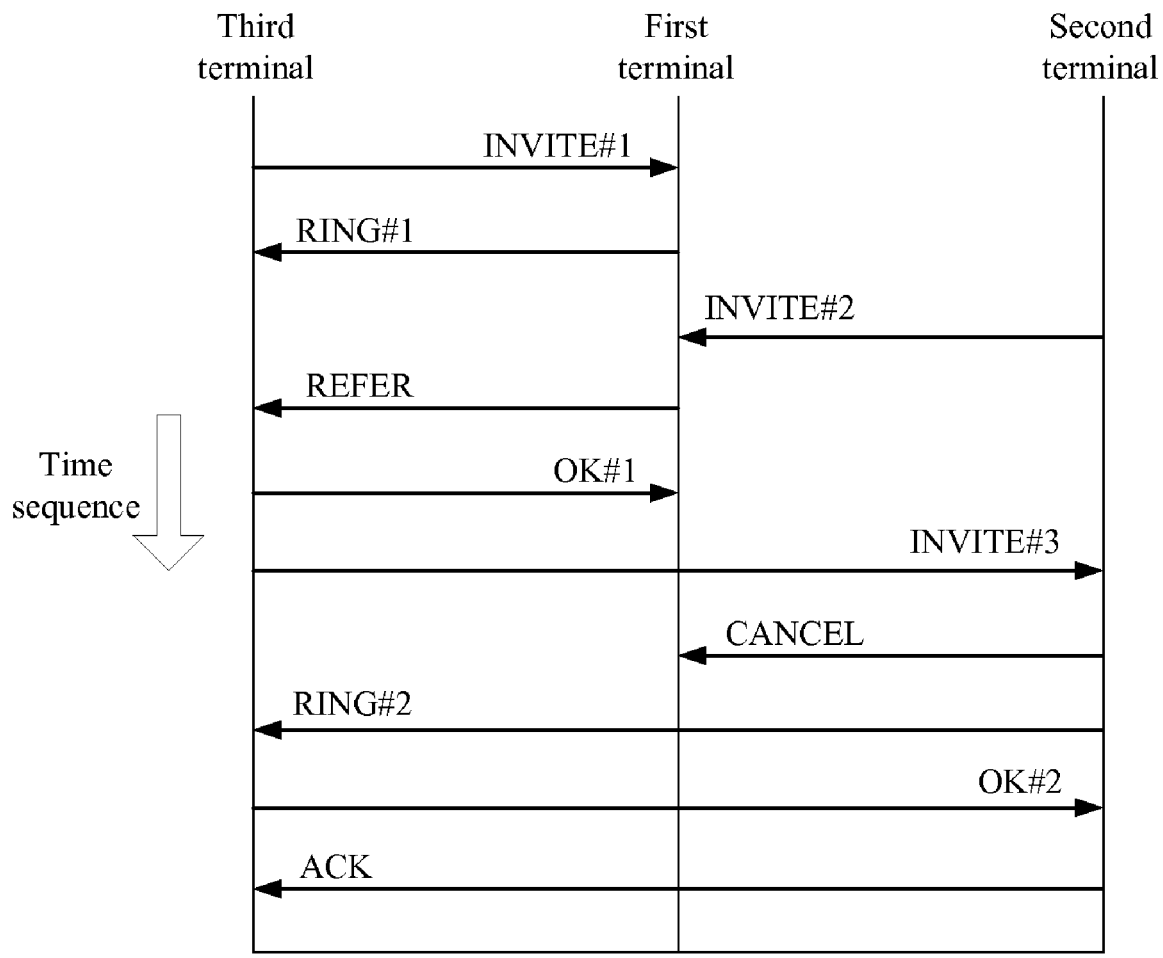
FIG. 2 illustrates a flowing path of signals among a caller, a callee, and a pickupper according to one embodiment of the invention.

Please refer to FIG. 1 together with FIG. 2. FIG. 2 illustrates a flowing path of signals among a caller, a callee, and a pickupper according to one embodiment of the invention. In the embodiment, the third terminal 20 represents the caller; the first terminal 12 represents the callee; the second terminal 14 represents the pickupper. In order to further understand the concept of the invention, examples in the following are described in detail.

While the first terminal 12 receives an incoming call from the third terminal 20, the third terminal 20 transmits a message "INVITE #1" to the first terminal 12. Then the first terminal 12 transmits a message "RING #1" to the third terminal 20 and generates a ring message simultaneously. At the same time, dependent on a user U2 of the second terminal 14, a pickup request message (as INVITE #2 shown in FIG. 2) can be transmitted to the first terminal 12 via the common group extension 140.

For example, the second terminal 14 can transmit the pickup request message after the first terminal 12 idles for a first predetermined time or after the first terminal 12 rings for a second predetermined time. The first predetermined time represents the passed time since the user U1 of the first terminal 12 ends the last call, e.g. 10 seconds. During the first predetermined time, if the user U1 does not leave the first terminal 12, it can not be allowed that the pickup request message is transmitted to the first terminal 12 via the second group extension 140 by the user U2 of the second terminal 14 in order not to disturb the user U1 to answer the incoming call. It is noted that the first predetermined time and the second predetermined time are designed according to practical demands.

After the second terminal 14 transmits the pickup request message to the first terminal 12, the pickup request message from the second terminal 14 is received via the common group extension 120 at the first terminal 12. Because the second terminal 14 transmits the pickup request message to the first terminal 12 via the common group extension 140, the first terminal 12 can start a call pickup procedure automatically by recognizing that the second terminal 14 asks for the call pickup.

In one embodiment, the pickup request message comprises first identification information. In practice, the first identification information can be in a package header of the pickup request message. After the pickup request message from the second terminal 14 is received, the first terminal 12 transmits a transfer message (as "REFER" shown in FIG. 2) comprising the first identification information to the third terminal 20.

After the transfer message from the first terminal 12 is received, the third terminal 20 transmits a message "OK #1" to the first terminal 12, indicating that the second terminal 14 is authorized to pick up the incoming call. Besides, after receiving the message "OK #1", the first terminal 12 terminates the ring message. Subsequently, the third terminal 20 transmits an invitation message (as INVITE #3 shown in FIG. 2) to the second terminal 14.

It is noted that after the invitation message "INVITE #3" is transmitted to the second terminal 14, the second terminal 14 further judges if the second identification information corresponds to the first identification information or not. If YES, the second terminal 14 transmits a "CANCEL" message to the first terminal 12 and asks the first terminal 12 to be in an idle state. Afterwards, the second terminal 14 transmits a message "RING #2" to the third terminal 20.

After receiving the message "RING #2" from the second terminal 14, the third terminal 20 transmits a message "OK #2" to the second terminal 14. Subsequently, the second terminal 14 transmits a message "ACK" to the third terminal 20 in order to establish the incoming call between the second terminal 14 and the third terminal 20.

It is noted that if the third terminal 20 terminates the incoming call or a user U3 of the fourth terminal 16 of the communication network system 1 picks up the incoming call via the common group extension 160, the second terminal 14 can be controlled to be in an idle state.

Figure 3:
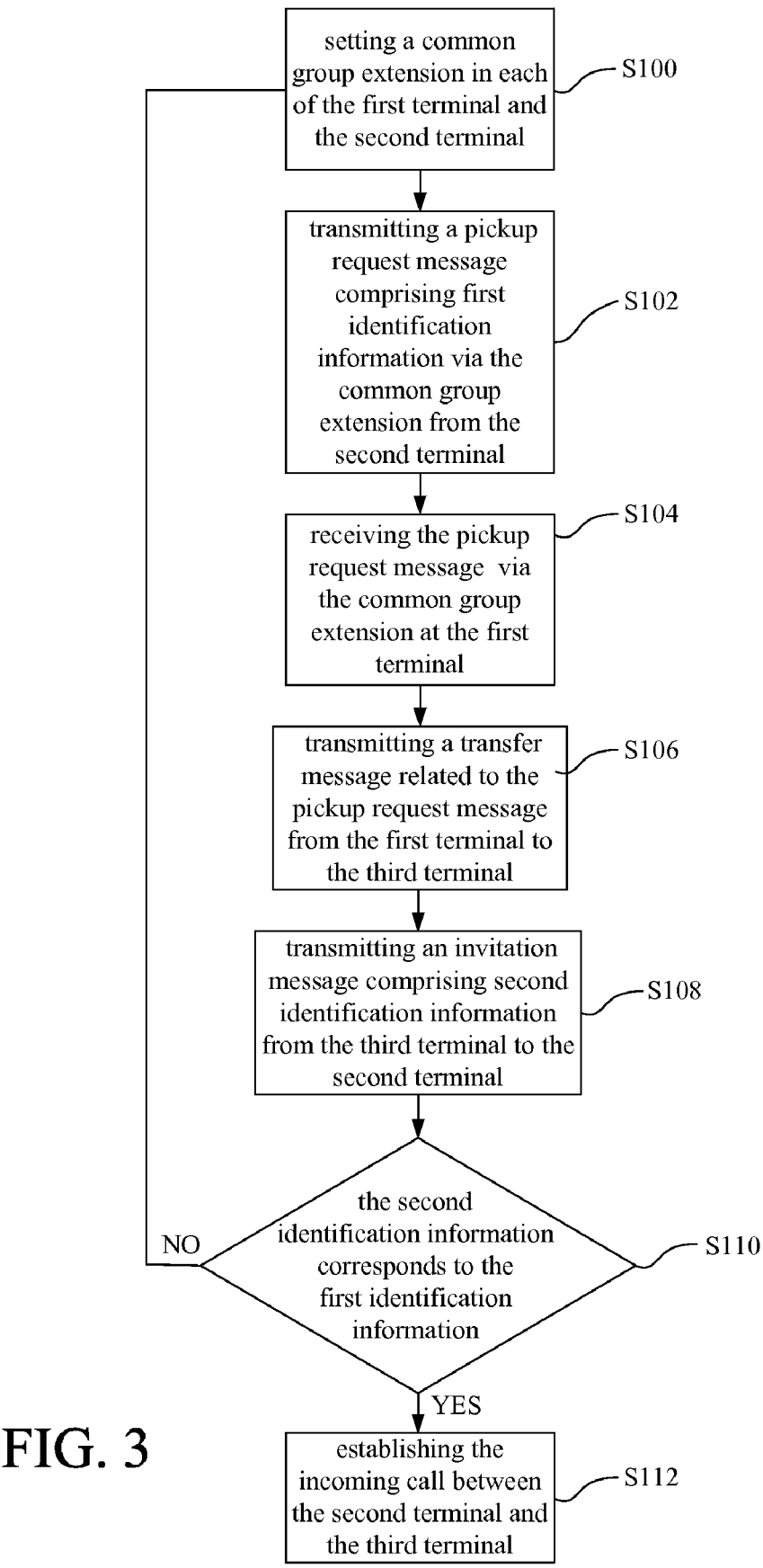
FIG. 3 illustrates a flow chart of a call pickup method according to another embodiment of the invention.

Please refer to FIG. 3. FIG. 3 illustrates a flow chart of a call pickup method according to another embodiment of the invention. The call pickup method is suitable for a communication network system comprising a first terminal and a second terminal.

First of all, step S100 is performed and a common group extension is set, for the first terminal and the second terminal, in each of the first terminal and the second terminal. The common group extension is shared by the first terminal and the second terminal.

When the first terminal receives an incoming call from a third terminal, step S102 is performed to transmit a pickup request message from the second terminal via the common group extension. It is remarkable that in step S102, the second terminal transmits the pickup request message after the first terminal idles for a first predetermined time or after the first terminal rings for a second predetermined time.

Subsequently, S104 is performed to receive the pickup request message from the second terminal via the common group extension at the first terminal. Subsequently, the step S106 is performed to transmit a transfer message related to the pickup request message from the first terminal to the third terminal.

In one embodiment, the pickup request comprises first identification information, and a transfer message comprising the first identification is transmitted to the third terminal in step S106. Additionally, a ring message of the first terminal can be terminated by the method after the transfer message is transmitted.

Next, step S108 is performed to transmit an invitation message from the third terminal to the second terminal. For the mentioned first identification information, the invitation message comprising second identification information is transmitted to the second terminal. Additionally, the first terminal can be returned to an idle state by the method after the invitation message is transmitted.

Afterwards, step S110 is performed to judge if the second identification information corresponds to the first identification information or not. If YES in step S110, the step S112 is performed to establish the incoming call between the second terminal and the third terminal. If NO in step S110, the method returns to step S102.

To sum up, the call pickup method of the invention is to set a common group extension for a terminal group in a communication network system. Thus, the group can have the function of call pickup. Because the mentioned group extension is standard for a PBX server, the call pickup method of the invention needs not extra support or complicated settings of the PBX server. Additionally, another advantage of the invention is that a user can pick up the incoming call to some phone without remembering the extension number of the phone.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A call pickup method for a communication network system comprising a first terminal and a second terminal, the method comprising the steps of:
   (a) setting a common group extension, for the first terminal and the second terminal, in each of the first terminal and the second terminal;
   (b) transmitting a pickup request message via the common group extension from the second terminal while the first terminal is receiving an incoming call from a third terminal, wherein the second terminal transmits the pickup request message after the first terminal idles for a first predetermined time or after the first terminal rings for a second predetermined time;
   (c) receiving the pickup request message from the second terminal via the common group extension at the first terminal;
   (d) transmitting a transfer message related to the pickup request message from the first terminal to the third terminal;
   (e) transmitting an invitation message from the third terminal to the second terminal; and
   (f) establishing the incoming call between the second terminal and the third terminal.

2. The method of claim 1, wherein the pickup request message comprises a first identification information, and the transfer message comprising the first identification information is transmitted to the third terminal in step (d); the invitation message comprising a second identification information is transmitted to the second terminal in step (e).

3. The method of claim 2, wherein step (e) further comprises the following steps of:
   (e1) judging if the second identification information corresponds to the first identification information or not; and
   (e2) if YES in step (e1), performing the step (f).

4. The method of claim 1, wherein the step (d) further comprises the following step of:
   (d1) terminating a ring message of the first terminal after transmitting the transfer message.

5. The method of claim 1, wherein the step (e) further comprises the following step of:
   (e3) after the invitation message is transmitted, controlling the first terminal to be in an idle state.

6. The method of claim 1, wherein the step (b) further comprises the following step of:
   (b1) if the third terminal terminates the incoming call or a fourth terminal of the communication network system picks up the incoming call, controlling the second terminal to be in an idle state.

7. The method of claim 1, wherein the communication network system comprises a PBX (Private Branch Exchange) server.

8. The method of claim 1, wherein a session initiation protocol is applied to the communication network system.

9. A communication network system comprising:
   a server;
   a first terminal; and
   a second terminal, wherein a common group extension, for the first terminal and the second terminal, is set in each of the first terminal and the second terminal, the first terminal and the second terminal communicating with each other via the server;
   wherein a pickup request message is transmitted via the common group extension from the second terminal while the first terminal is receiving an incoming call from a third terminal, wherein the pickup request message is transmitted from the second terminal after the first terminal idles for a first predetermined time or after the first terminal rings for a second predetermined time; subsequently, the pickup request message is received via the common group extension at the first terminal; then, a transfer message related to the pickup request message is transmitted from the first terminal to the third terminal; next, an invitation message is transmitted from the third terminal to the second terminal; afterwards, the incoming call is established between the second terminal and the third terminal.

10. The system of claim 9, wherein the pickup request message comprises a first identification information, and the transfer message comprising the first identification information is transmitted to the third terminal from the first terminal; the invitation message comprising a second identification information is transmitted to the second terminal from the third terminal.

11. The system of claim 10, wherein after the invitation message is transmitted to the second terminal, the second terminal further judges if the second identification information corresponds to the first identification information or not, if YES, the incoming call is established between the second terminal and the third terminal.

12. The system of claim 9, wherein the first terminal terminates a ring message after the transfer message is transmitted from the first terminal.

13. The system of claim 9, wherein the first terminal is returned to an idle state after the invitation message is transmitted from the third terminal.

14. The system of claim 9, wherein if the third terminal terminates the incoming call or a fourth terminal of the communication network system picks up the incoming call, the second terminal is returned to an idle state.

15. The system of claim 9, wherein the communication network system comprises a PBX server.

16. The system of claim 9, wherein a session initiation protocol is applied to the communication network system.

* * * * *